United States Patent
Vereb et al.

(10) Patent No.: US 9,177,675 B2
(45) Date of Patent: Nov. 3, 2015

(54) PASSIVE CONTAINMENT AIR COOLING FOR NUCLEAR POWER PLANTS

(75) Inventors: Frank T. Vereb, Coraopolis, PA (US); William L. Brown, Pittsburgh, PA (US); Forrest T. Johnson, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 733 days.

(21) Appl. No.: 13/444,967

(22) Filed: Apr. 12, 2012

(65) Prior Publication Data

US 2013/0272475 A1  Oct. 17, 2013

(51) Int. Cl.
*G21C 15/14* (2006.01)
*G21C 15/18* (2006.01)
*G21C 15/26* (2006.01)

(52) U.S. Cl.
CPC ............. *G21C 15/18* (2013.01); *G21C 15/26* (2013.01); *Y02E 30/40* (2013.01)

(58) Field of Classification Search
CPC ........................................................ G21C 15/18
USPC ................................................. 376/298, 299
See application file for complete search history.

(56) References Cited

U.S. PATENT DOCUMENTS

| | | | |
|---|---|---|---|
| 3,071,159 A | | 1/1963 | Coraggioso |
| 3,478,820 A | | 11/1969 | Huber |
| 3,629,065 A | * | 12/1971 | Knox ............................ 376/377 |
| 5,043,135 A | | 8/1991 | Hunsbedt et al. |
| 5,169,596 A | * | 12/1992 | Orr ................................ 376/293 |
| 5,229,068 A | | 7/1993 | Johansson et al. |
| 6,246,739 B1 | * | 6/2001 | Khorana et al. .............. 376/309 |
| 7,086,823 B2 | | 8/2006 | Michaud |
| 7,938,615 B2 | | 5/2011 | Michaud |
| 2011/0052369 A1 | * | 3/2011 | Michaud ........................ 415/4.2 |

OTHER PUBLICATIONS

International Search Report for PCT/US2013/034258 dated Sep. 27, 2013 (Form PCT/ISA/210).
Written Opinion of the International Searching Authority for PCT/US2013/034258 dated Sep. 27, 2013 (Form PCT/ISA/237).
International Preliminary Report on Patentability for PCT/US2013/034258 dated Oct. 23, 2014 (Forms PCT/IB/326, PCT/IB/373, PCT/ISA/237).

* cited by examiner

*Primary Examiner* — Jack W Keith
*Assistant Examiner* — Sean P Burke
(74) *Attorney, Agent, or Firm* — Richard J. Coldren; Westinghouse Electric Company LLC

(57) ABSTRACT

A passive containment air cooling system for a nuclear power plant that enhances air flow over a metal containment that houses the reactor system to improve heat transfer out of the containment. The heat transfer is improved by employing swirl vanes to mix the air as it rises over the walls of the containment due to natural circulation and a vortex engine proximate an exit along the cooling air path to increase the quantity of air drawn along the containment.

10 Claims, 4 Drawing Sheets

PASSIVE CONTAINMENT AIR COOLING FOR NUCLEAR POWER PLANTS

CROSS REFERENCE TO RELATED APPLICATIONS

This application is related to co-pending patent application Ser. No. 13/444,932, filed concurrently herewith.

BACKGROUND

1. Field

This present invention relates to a passive containment cooling system for a nuclear reactor power plant and more specifically to a passive containment air cooling system that relies on natural circulation of air over the surface of a metal containment.

2. Related Art

Nuclear power has played an important part in the generation of electricity since the 1950s and has advantages over thermal electric and hydraulic power plants. The generation of electricity by nuclear power is accomplished by the nuclear fission of radioactive materials. Due to the volatility of the nuclear reactions, nuclear power plants are required by practice to be designed in such a manner that the health and safety of the public is assured even for the most adverse accident that can be postulated. For plants utilizing water as a coolant, the most adverse accident is considered to be a double ended break of the largest pipe in the reactor cooling system and is termed a loss of coolant accident (LOCA).

For accident protection, these plants utilize containment systems that are designed to physically contain water, steam and any entrained fission products that may escape from the reactor cooling system. The containment system is normally considered to encompass all structures, systems and devices that provide ultimate reliability and complete protection for any accident that may occur. Engineered safeguard systems are specifically designed to mitigate the consequences of an accident. Basically, the design goal of a containment system is that no radioactive material escapes from the nuclear power plant in the event of an accident so that the lives of the surrounding populous are not endangered.

Recently, reactor manufacturers have offered passive plant designs, i.e., plants that will shut down in the event of an accident without the operator intervention or off-site power. Westinghouse Electric Company LLC offers the AP1000 passive plant design that employs a passive containment cooling system that uses a large steel shell. The containment cooling system suppresses the rise in pressure that will likely occur within the containment in the unlikely event of a loss of coolant accident. The passive containment cooling system is an engineered safety feature system. Its objective is to reduce the containment temperature and pressure, following a loss of coolant accident or steam line break accident inside the containment, by removing thermal energy from the containment atmosphere. The passive containment cooling system also serves as a means of transferring heat for other events resulting in a significant increase in containment pressure and temperature. The passive containment cooling system also limits release of radioactivity (post accident) by reducing the pressure differential between the containment atmosphere and the external environment, thereby diminishing the driving force for leakage of fission products from the containment to the atmosphere. The passive containment cooling system also provides a source of make-up water to the spent fuel pool cooling water. To achieve the foregoing objectives, the containment building is made of steel to provide efficient heat transfer from within to outside of the containment. During normal operation, heat is removed from the containment vessel by continuous natural circulation of air. During an accident, however, more heat removal is required and air cooling is supplemented by evaporation of water, provided by a passive containment cooling system water storage tank and gravity feed.

An AP1000 containment system 10 is schematically illustrated in FIG. 1, surrounding an AP1000 reactor system including a reactor vessel 12, steam generator 14, pressurizer 16 and main coolant circulation pump 18; all connected by the piping 20. The containment system 10 in part comprises a steel dome containment vessel enclosure 22 surrounded by a concrete shield building 24 which provides structural protection for the steel dome containment vessel 22.

The major components of the passive containment cooling system are a passive containment cooling water storage tank 26, an air baffle 28, air inlet 30, air exhaust 32 and water distribution system 34. The passive containment cooling water storage tank 26 is incorporated into the shield building structure 24, above the steel dome containment vessel 22. An air baffle 28 located between the steel dome containment vessel 22 and the concrete shield building 24 defines the cooling air flow path which enters through an opening in the shield building 24 at an elevation approximately at the top of the steel dome containment vessel 22. After entering the shield building 24, the air path travels down one side of the air baffle 28 and reverses direction around the air baffle at an elevation adjacent the lower portion of the steel dome containment vessel. The air path then flows up between the baffle and the steel dome containment vessel 22 and exits at the exhaust opening 32 in the top of the shield building 24. The exhaust opening 32 is surrounded by the passive containment cooling water storage tank 26.

In the unlikely event of an accident, the passive containment cooling system provides water that drains by gravity from the passive containment cooling water storage tank 26 and forms a film over the steel dome containment vessel 22. The water film evaporates thus removing heat from the containment building 22.

The passive containment cooling system is capable of removing sufficient thermal energy, including subsequent decay heat, from the containment atmosphere following a Design Basis event resulting in containment pressurization such that the containment pressure remains below the design value with no operator action required for at least 72 hours.

The air flow path that is formed between the shield building 24, which surrounds the steel dome containment vessel 22, and the air baffle 28 results in the natural circulation of air upward along the containment vessel's outside steel surface. This natural circulation of air is driven by buoyant forces when the flowing air is heated by the containment steel surface and when the air is heated by and evaporates water that is applied to the containment surface. The flowing air also enhances the evaporation that occurs from the water surface. In the event of an accident, the convective heat transfer to the air by the heated containment steel surface only accounts for a small portion of the total heat transfer that is required, such total heat transfer being primarily accomplished by the evaporation of water from the wetted areas of the containment steel surface, which cools the water on the surface which then cools the containment steel, which then cools the inside containment atmosphere and condenses steam within the containment.

Water is continuously applied via gravity from the passive containment cooling water storage tank 26 to the containment vessel steel surface 22 for the first seventy two hours following a Design Basis event. The application of water to the containment vessel steel surface 22 enhances heat transfer through the vessel and aids in condensing the steam within the containment, therefore also limiting the pressure increase within the containment. After the first seventy two hours, active onsite pumping methods will provide makeup water to the passive containment cooling water storage tank 26 for at least an additional four days. Additional onsite and offsite water sources and pumping methods continue to provide makeup water to the passive containment cooling water storage tank 26 after seven days.

It is an object of this invention to enable air cooling alone of the containment vessel to provide sufficient decay heat removal to maintain acceptably low containment pressure after the initial three days.

Furthermore, it is an object of this invention to enable air cooling of the containment vessel to provide such sufficient decay heat removal with no reliance on active components, operator actions, or non-safety onsite or offsite water supplies.

Additionally, it is an object of this invention to provide sufficient air cooling of the containment vessel that will enable a reduction in the size of the passive containment cooling water storage tank that is required.

SUMMARY

These and other objects are achieved in accordance with the embodiments set forth hereafter which include the application of swirl generators, guide vanes, and a vortex engine. More particularly, the embodiments set forth include a solid metal nuclear containment shell having sides and a cover, sized to surround at least a portion of the primary coolant loop of a nuclear reactor system. An outer housing having sides and a roof substantially surrounds and is spaced from an exterior surface of the solid metal shell forming an annular cooling fluid passage around the exterior surface of the sides of the solid metal shell that communicates with a passage between the cover and the roof. A fluid intake communicates between the outside of the outer housing and a lower portion of the annular passage and a fluid exit extends through a portion of the roof. A swirl vane assembly is supported in the annular passage between an interior of the sides of the housing and the exterior surface of the sides of the metal shell to enhance the turbulence and mixing of the air rising in the annular passage along the solid metal shell as the air is heated by the heat transmitted through the solid metal shell.

Preferably, a swirl vane assembly, comprising at least two swirl vanes which are positioned at approximately the same elevation and proximate each other with at least two swirl vanes arranged in a counter rotating pair to enhance the mixing of the air as it rises along the solid metal shell. In a preferred embodiment, the swirl vane assembly comprises a plurality of the counter rotating pairs of swirl vanes, which are circumferentially spaced around the exterior surface of the sides of the solid metal shell at approximately the same elevation. Desirably, the same elevation is in a lower portion of the annular passage. In one embodiment, the swirl vane assembly is supported from the wall opposite the exterior surface of the solid metal shell and, preferably, a baffle is interposed between the sides of the housing and the exterior surface of the solid metal shell so that the baffle extends approximately from a lower surface of the roof of the housing to an elevation juxtaposed to a lower portion of the sides of the solid metal shell below the swirl vane assembly so that the cooling air intake through the housing communicates cooling air between the baffle and the housing and into the annular passage below the swirl vane assembly. Desirably, the swirl vane assembly is supported on an interior of the baffle. As a further improvement, the swirl vane assemblies comprise at least two swirl vane assemblies supported at two spaced elevations, one above the other.

In still another embodiment, the nuclear reactor containment includes a vortex engine 42 supported proximate to or within the air exhaust 32.

In still another embodiment, directional guide vanes 44 are supported in the passage between the cover and the roof, that are oriented to direct the cooling fluid from the annular passage to an intake on the vortex engine.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
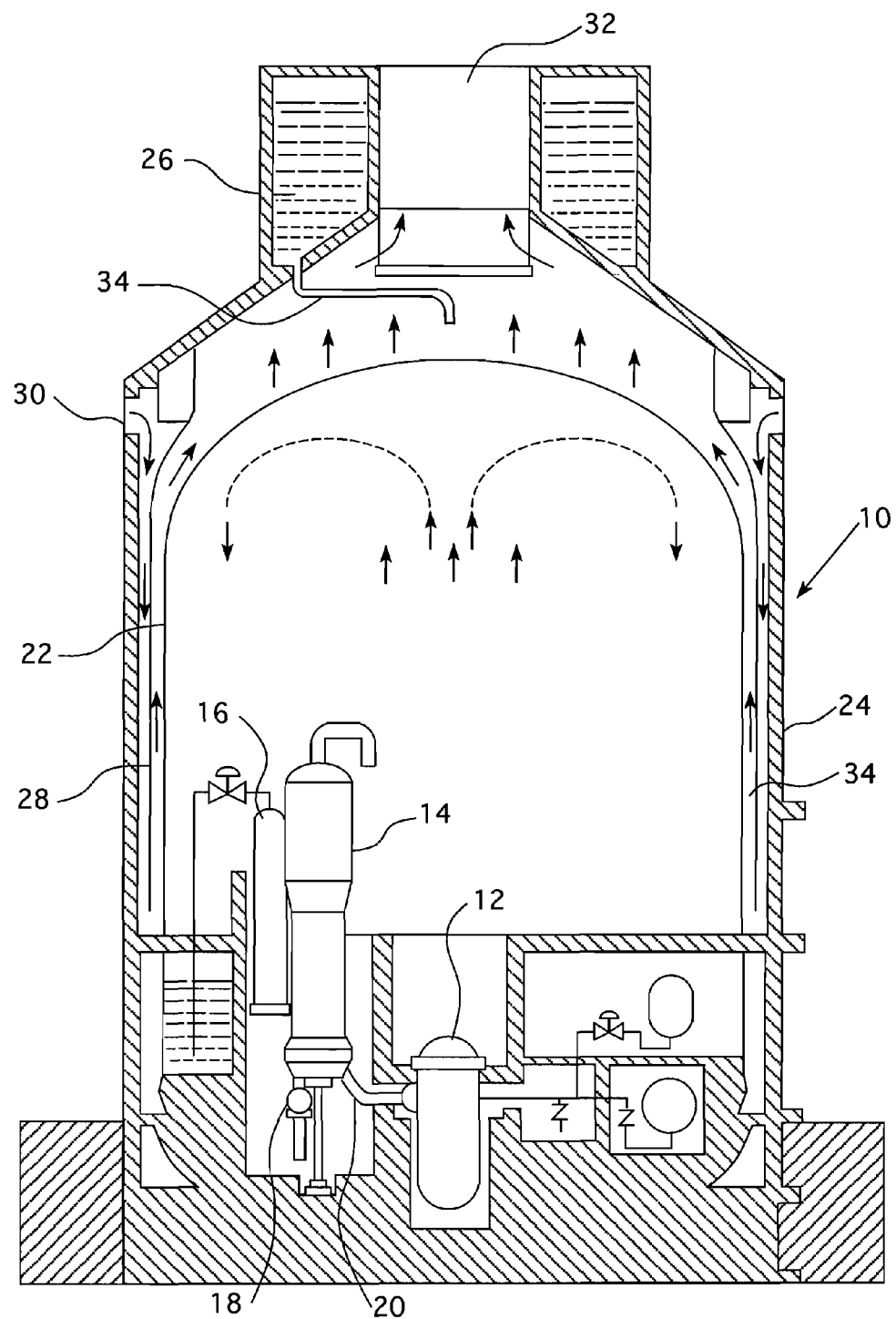
FIG. 1 is a simplified schematic of an AP1000 nuclear power plant.

As previously mentioned, in an AP1000® passive cooling containment system, the convective heat transfer to the air by the heated containment steel surface only accounts for a small portion of the total heat transfer; such total heat transfer being primarily accomplished by the evaporation of water from the wetted areas of the containment steel surface, which cools the water on the surface, which then cools the containment steel, which then cools the inside containment atmosphere and condenses steam. It is an object of the embodiment described herein to enable air cooling alone to provide sufficient heat removal to maintain acceptably low containment pressure with no reliance on active components, operator actions, or auxiliary water supplies, after the initial three days when the initial water volume in the passive containment cooling water storage tank 26 has been exhausted.

The foregoing objective is achieved in related co-pending application Ser. No. 13/444,932, filing date Apr. 12, 2012, by creating a tortuous air path and in effect creating an increased surface area over the steel containment vessel over which cooling air flows. The embodiments described herein achieve the same objective by promoting better mixing of the air within the annular passage 34 between the baffle 28 and the steel dome shell 22 and by drawing more air per unit time through that passage. Either of these concepts can be used alone or they can be used together to promote more efficient cooling of the reactor containment. Though, the dome containment shell 22 is identified as being constructed out of steel it should be appreciated that the containment vessel can be constructed out of other materials that have relatively good thermal conductivities and the necessary integrity and strength. Also, it should be appreciated that the water film during the discharge of the passive containment cooling water storage tank 26 will follow a flow path over the steel dome containment vessel that is opposite to the direction of flow of the air path.

The design of the AP1000 nuclear power plant passive containment cooling system utilizes the steel containment vessel 22, the shield building 24 and the air baffle 28 to form an air flow path driven by natural circulation. The cooler outside air is drawn into the sides of the shield building 24 through inlet vents 30 and directed downward around the baffle 28. The cool air then turns back upwards and travels countercurrent to water flowing down the containment vessel shell 22. Heat is transferred from the vessel steel to the water and finally to the air flowing up and out the chimney 32. The buoyancy of the warm air leaving the chimney helps to drive the air flow through the annulus 34.

Figure 2:
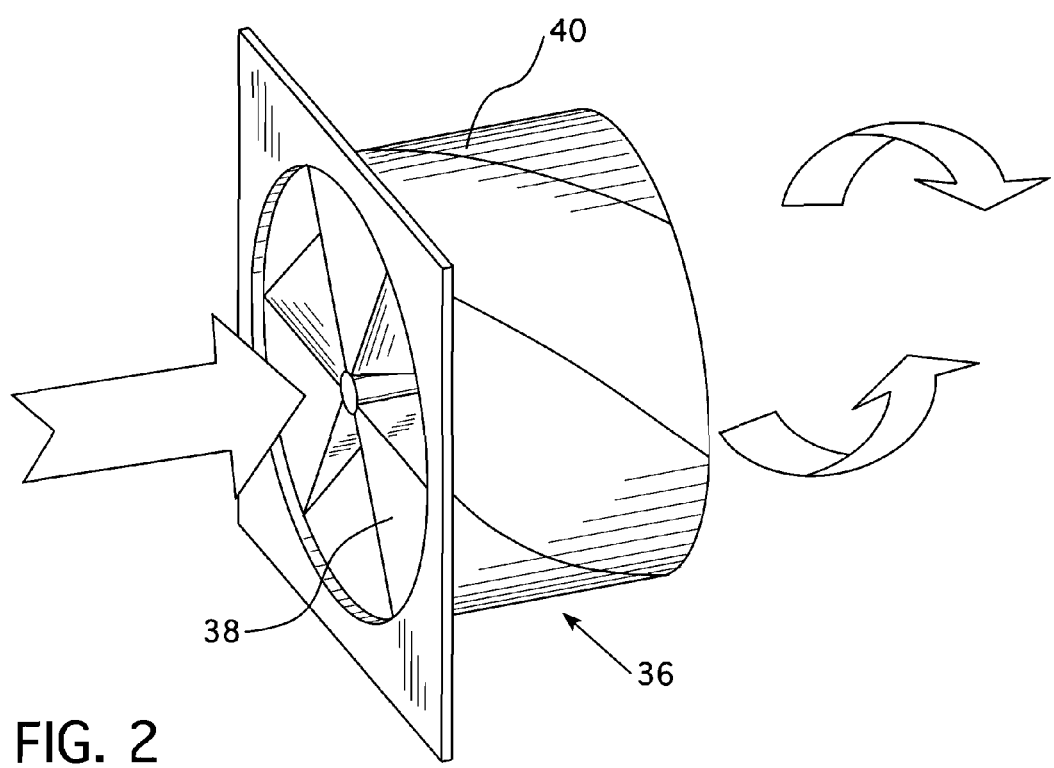
FIG. 2 is a perspective view of a swirl vane which can be employed in the containment shown in FIG. 1.

The AP1000 passive containment cooling system utilizes water from the passive containment cooling system storage tank 26 on the top of the shield building 24, a safety related source, for the first 72 hours. Traditionally, from 72 hours to seven days, water is supplied by an ancillary tank on the plant site, although this action requires operator intervention as well as AC power. It is the object of this embodiment to enhance the air flow through the annulus 34 such that continued water cooling after 72 hours can be replaced with passive air-only cooling that will maintain the pressure within the containment within design limits. To accomplish the foregoing objective, the preferred embodiment employs a swirl generator such as the swirl vane assembly 36 shown in FIG. 2 to improve decay heat removal from the containment vessel 22 by passively rotating the air in the annulus so that the cooler air adjacent the baffle 28 is rotated towards the steel dome enclosure 22 as the air moves up the annulus to disrupt the thermal boundary layer and enhance the heat transfer across the steel dome enclosure. The term "passive" is employed to indicate that there are no moving parts and the action is accomplished without any need for an outside power source. The swirl generator illustrated in FIG. 2 is a swirl vane assembly 36 that has a tubular housing that supports a number of curve vanes whose arc transforms an axial intake of air into a swirling pattern.

Figure 3:
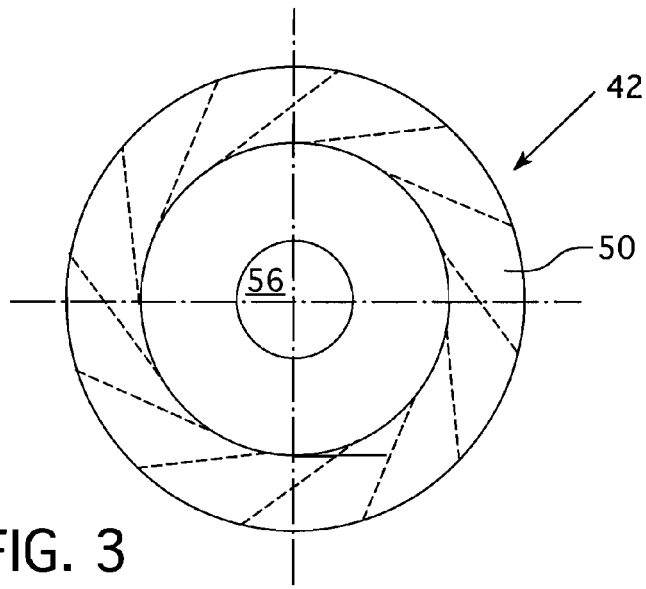
FIG. 3 is a plan view of a vortex engine which can be employed proximate to or within the chimney in the shield building shown in FIG. 1.
Figure 4:
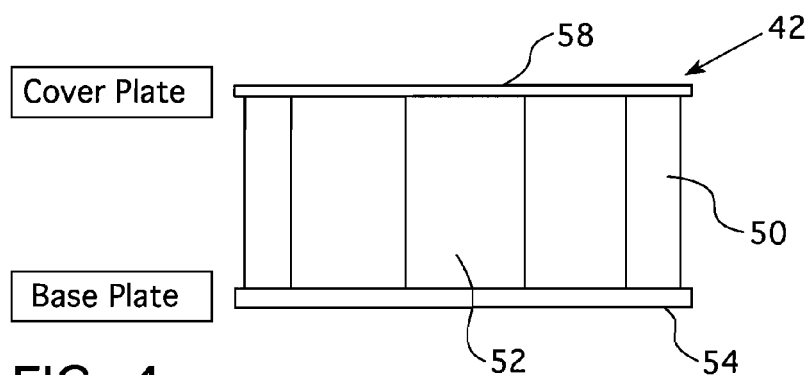
FIG. 4 is a side view of the vortex engine shown in FIG. 3.
Figure 5:
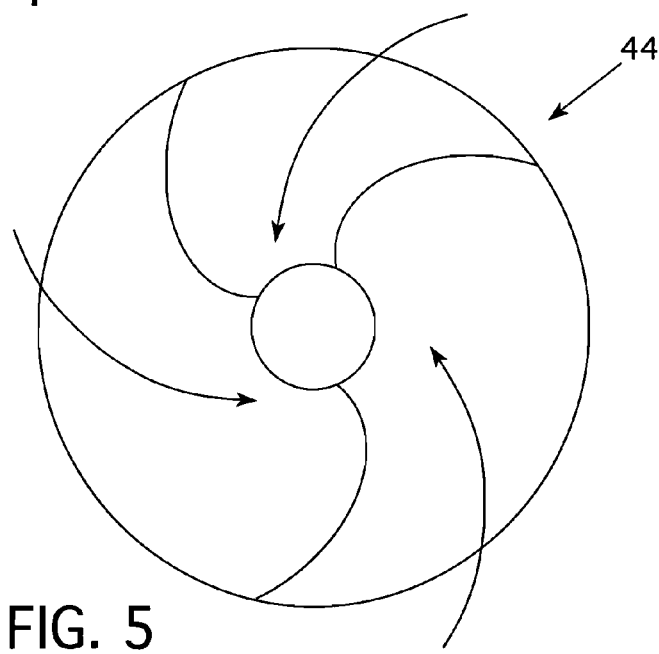
FIG. 5 is a plan view of the guide vanes that can be employed in the space between the roof of the shield building and the cover of the steel dome containment vessel to guide the rising heated air into the vortex engine.

The embodiment employed herein may also employ a vortex engine such as the one illustrated in FIGS. 3 and 4 to generate a virtual chimney in combination with the air exhaust exit 32 on top of the shield building 24 and use this virtual chimney to improve decay heat removal. The combination of the swirl generators 36 with a vortex engine 42 can be further enhanced with the use of guide vanes 44 in the space between the underside of the roof of the shield building 24 and the cover of the steel dome enclosure 22. None of the swirl generators, vortex engine or guide vanes require moving parts or are maintenance intensive. Nevertheless, this combination of elements enhances the natural draft through the annulus of the shield building without the use of fans or AC power, or physically increasing the height of the shield building chimney. Preferably, the swirl generators 36 are arranged in counter-rotating pairs in the annulus 34.

Figure 6:
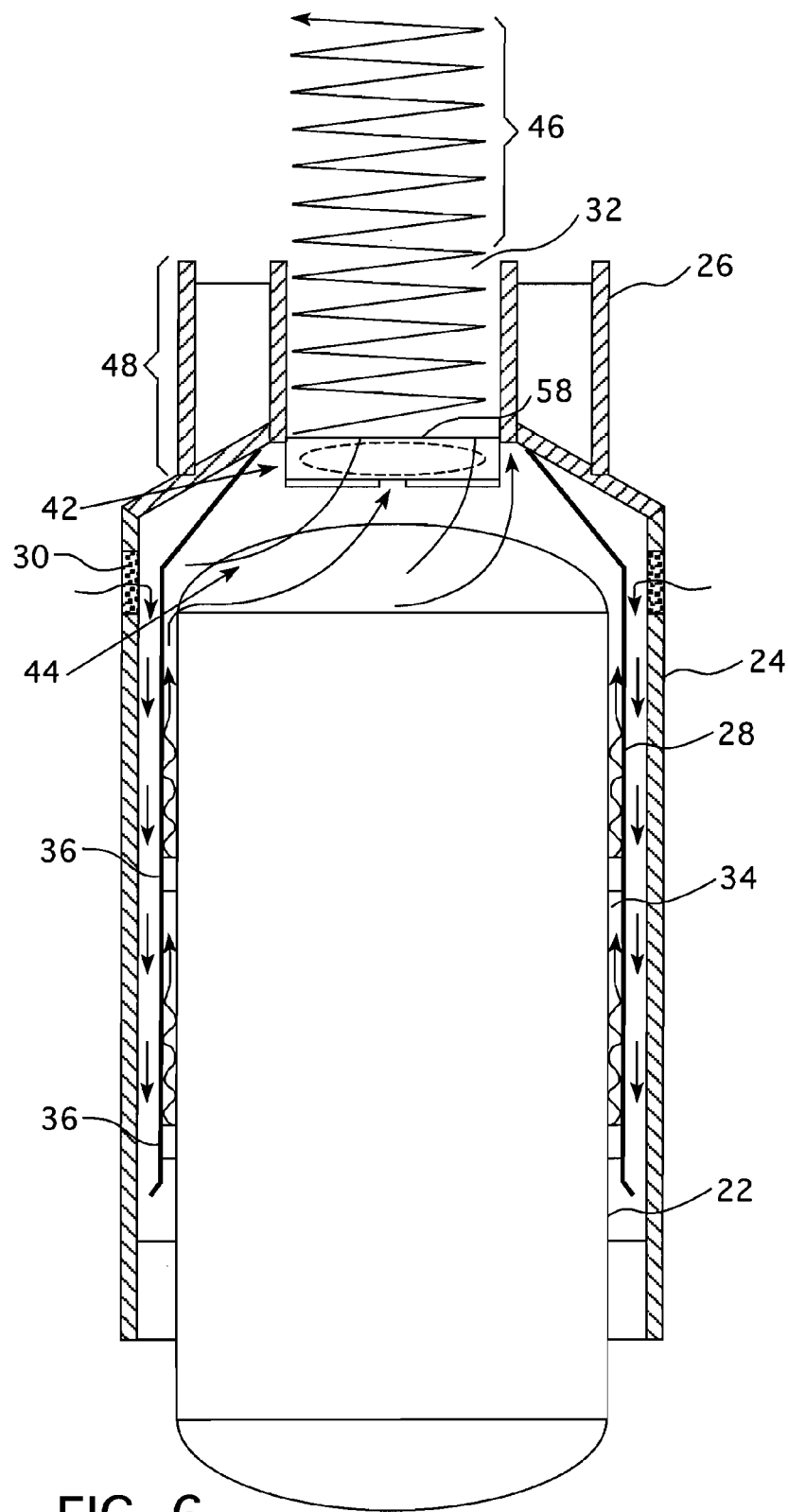
FIG. 6 is a simplified schematic view of the containment system shown in FIG. 1 incorporating the swirl vanes, guide vanes and vortex engine of one embodiment described herein.

Thus, in accordance with this embodiment, swirl generators 36 are attached to the inside surface of the baffle 28 adjacent to the steel dome enclosure 22 in a lower portion of the annular passage 34. The purpose of the swirl generators 36 is to make the air flow rising up the annulus region 34, counter current to the water flow streaming down the surface of the steel dome enclosure 22, turbulent by means of rotating the air. This mixing of the warmer air near the vessel 22 with cooler air adjacent the baffle 28 using a swirling motion will thin the thermal boundary layer, thereby reducing resistance to heat transfer. Preliminary testing suggests the vortices produced by the swirl generators 36 will travel for an extensive distance before dissipating. An additional bank of swirl generators 36, as illustrated in FIG. 6, higher up in the annulus 34, may be employed to regenerate the vortices as necessary. Each swirl vane assembly 36 comprises two swirl vanes oriented to establish counter rotating air paths, i.e., air paths that rotate in opposite directions. At each elevation where the swirl vane assemblies are supported, the assemblies are equidistantly spaced circumferentially around the outer surface of the steel dome enclosure vessel 22.

By use of the swirl generators 36, heat transfer from the containment steel enclosure 22 to the water and then to the air is improved. However, adding any device in the air flow path through the annulus 34 will tend to impose a penalty on pressure drop and air velocity. This embodiment further contemplates that these losses can be recouped by increasing the thermal buoyancy of the system. This can be accomplished by the development of a virtual chimney, figuratively illustrated by reference character 46 in FIG. 6. The virtual chimney 46 extends from the top of the shield building chimney 48. The virtual chimney 46 is a high velocity cylinder of air rotating in tornado-like fashion that will help to pull air through the annulus region 34 and increase air velocity such that losses incurred by the swirl generators 36 are compensated for and heat transfer is further increased.

A vortex generator is an aerodynamic surface consisting of a small vane or vanes that create a vortex. A vortex engine works on the principal that mechanical energy is produced when water descends or when warm air rises. The atmospheric vortex engine captures the energy produced when warm air rises by creating a river of rising air using an air vortex which acts as a vertical conduit. The vortex is produced by admitting warm or humid air tangentially into a circular arena. Tangential entries cause the warm moist air to spin as it rises forming an "anchored vortex." Centrifugal forces in the vortex prevents the rising air from becoming diluted by cooler ambient air and thereby losing its buoyancy. Once the turbulent air flow produced by the swirl generators 36 in the annulus 34 has progressed to the dome region between the steel containment vessel 22 and the shield building 24, guide vanes 44 will aid in "pre-swirling" the air flow towards the shield building chimney 48 in a favorable swirling motion. The guide vanes 44 assist in developing the larger vortex required to be generated by the vortex engine 42. The vortex engine 42 is positioned within, on or near the chimney 48 of the shield building 24 and may, in principal, be a larger scale version of a swirl generator. The air entering the inlet 50 of the vortex engine 42 will do so in a tangential fashion and will produce a high velocity cylinder of air that will extend some distance above the top of the shield building chimney 48 into the outside air with the portion of the extension above the shield building chimney making up the virtual chimney 46. This virtual chimney will extend the effective height of the shield building chimney 48, thereby increasing buoyancy and increasing the driving force for air flow.

A plan view of a vortex engine that can be employed for this purpose is illustrated in FIG. 3 with FIG. 4 showing a side view exposing the inlet to the vanes 52 that are capped by a base plate 54 having a central opening 56 and a cover 58. The air enters the vanes 52 and accelerates as it moves around to the arena and up the chimney drawing more air into the intake 50 as it extends upward and out the virtual extension of the chimney. Accordingly, more air is drawn through the system to overcome the pressure drop imparted by the swirl vane banks 36.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor containment comprising:
    a solid metal shell having sides and a cover, sized to surround at least a portion of a primary coolant loop of a nuclear reactor system, the solid metal shell having an exterior surface;
    an outer housing having sides and a roof, substantially surrounding and spaced from the solid metal shell forming an annular passage around the exterior surface of the sides of the solid metal shell that communicates with a passage between the cover and the roof;
    a fluid intake communicating between the outside of the outer housing and a lower portion of the annular passage;
    a fluid exit extending through a portion of the roof;
    a water reservoir positioned over the cover of the solid metal shell and configured to drain water over the cover under selected accident conditions, the water reservoir being sized to drain water over the solid metal shell for a preselected period of time; and
    a swirl vane assembly supported in the annular passage between an interior side of the sides of the housing and the exterior surface of the sides of the solid metal shell, the swirl vane assembly being configured to impart sufficient motion to a fluid traversing the annular passage to cool the solid metal after the preselected time to a degree that will maintain the primary coolant loop of the nuclear reactor system in a stable condition.

2. The nuclear reactor containment of claim 1 wherein the swirl vane assembly comprises at least two swirl vanes positioned at approximately a same elevation and proximate each other with the at least two swirl vanes arranged in a counter-rotating pair.

3. The nuclear reactor containment of claim 2 wherein the swirl vane assembly comprises a plurality of the counter-rotating pairs of swirl vanes circumferentially spaced around the exterior surface of the sides of the solid metal shell at approximately at the same elevation.

4. The nuclear reactor containment of claim 1 wherein the swirl vane assembly is supported from a wall opposite the exterior surface of the solid metal shell.

5. The nuclear reactor containment of claim 4 including a baffle interposed between the sides of the housing and the exterior surface of the solid metal shell, the baffle extending from approximately a lower surface of the roof of the housing to an elevation juxtaposed to a lower portion of the sides of the solid metal shell below the swirl vane assembly, wherein the fluid intake extends through the wall of the housing and under or through the baffle into the annular passage below the swirl vane assembly.

6. The nuclear reactor containment of claim 5 wherein the swirl vane assembly is supported on an interior wall of the baffle.

7. The nuclear reactor containment of claim 1 wherein the swirl vane assembly comprises at least two swirl vane subassemblies supported at two spaced elevations one above the other.

8. The nuclear reactor containment of claim 1 including a vortex engine supported proximate to or within the fluid exit.

9. The nuclear reactor containment of claim 8 including directional vanes supported in the passage between the cover and the roof that are oriented to direct a fluid from the annular passage to an intake on the vortex engine.

10. The nuclear reactor containment of claim 1 including a passive containment cooling fluid storage tank supported above the cover of the solid metal shell, the cooling fluid storage tank operable to release a cooling fluid over the cover under predetermined operating conditions of the nuclear reactor system.

* * * * *